Aug. 21, 1928.

W. A. NICHOLSON

ROAD SCRAPER

Filed April 8, 1927   2 Sheets-Sheet 1

1,681,873

Inventor
W. A. NICHOLSON

By
C. H. Parker Attorney

Aug. 21, 1928.
W. A. NICHOLSON
1,681,873
ROAD SCRAPER
Filed April 8, 1927    2 Sheets-Sheet 2
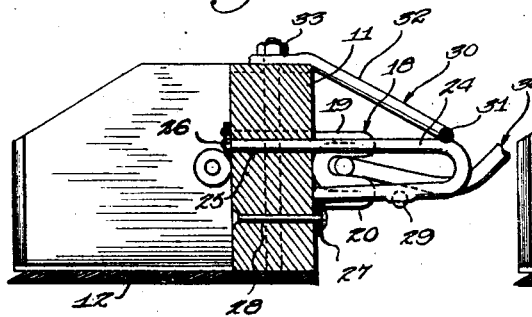
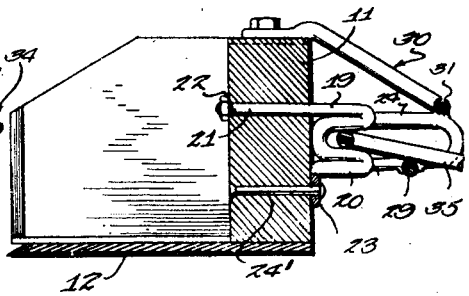
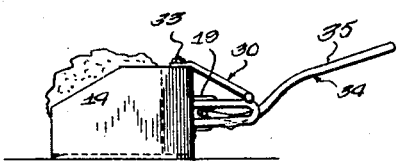
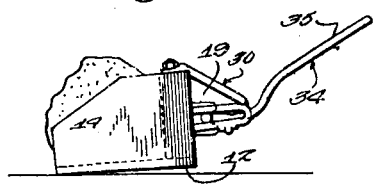
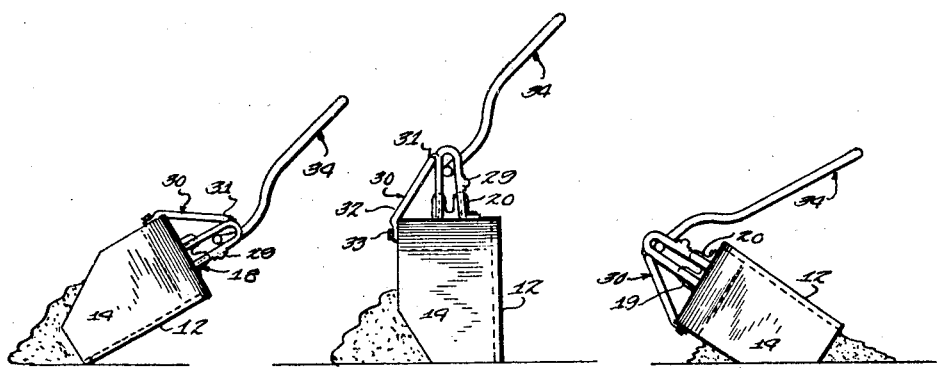
Inventor
W. A. NICHOLSON
By
Attorney Patented Aug. 21, 1928.

1,681,873

UNITED STATES PATENT OFFICE.

WILLIAM A. NICHOLSON, OF PRAIRIE DU CHIEN, WISCONSIN, ASSIGNOR OF ONE-HALF TO CHRISTIAN WINGEN, OF MARQUETTE, IOWA.

ROAD SCRAPER.

Application filed April 8, 1927. Serial No. 182,138.

This invention relates to scrapers and more particularly to road scrapers.

An important object of the invention is to provide a novel form of scraper adapted for use on roads and for similar purposes which is adapted to be drawn by any suitable source of power and to be readily controlled by a single operator.

A further object is to provide a scraper which is adapted to be easily controlled by a single operator to permit the angularity of the device to be controlled during the scraping operation and to permit the scraper readily to be dumped when desired.

A further object is to provide a scraper having a control handle arranged rearwardly thereof and adapted when in normal position to control the movement of the scraper, the handle being adapted to be moved by the operator to permit it to pivot freely with respect to the scraper whereby the latter may be dumped without the operator releasing the handle.

A further object is to provide a scraper of the character referred to wherein upward movement of the handle, when in normal position, by the operator is adapted to effect initial tilting of the scraper whereby the forward edge thereof will catch in the surface of the earth or the like whereupon further forward movement transmitted to the scarper by the source of power employed is adapted to complete the dumping movement, the handle being movable as soon as the initial dumping operation is effected to permit the handle to pivot with respect to the scraper whereby the latter may be completely dumped without necessitating the releasing of the handle by the operator.

Other objects and advantages of the invention will become apparent during the course of the following description.

In the drawings I have shown one embodiment of the invention. In this showing—

Figure 3 is a section on line 3—3 of Figure 2,

Figure 4 is a similar view on line 4—4 of Figure 2, and,

Figures 5 to 9 inclusive are side elevation showing the device in various position.

Figure 1:
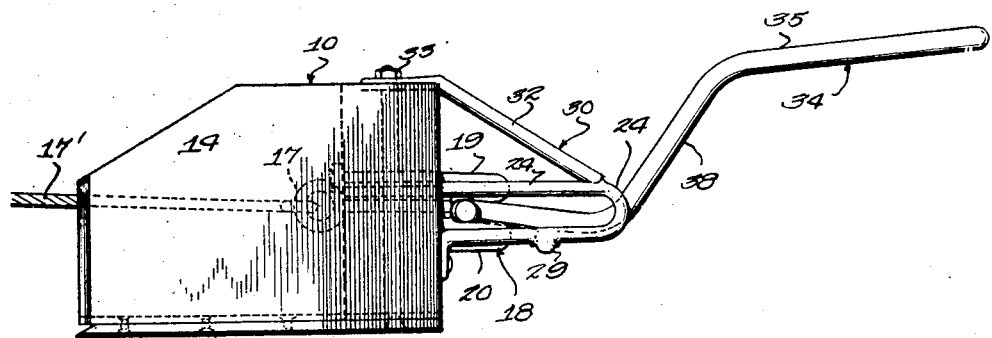
Figure 1 is a side elevation.

Referring to the drawings the numeral 10 designates the scraper as a whole which comprises a transverse back 11 preferably formed of wood, to which is bolted or otherwise secured a bottom 12 preferably formed of steel or the like. The forward edge of the bottom 12 is tapered as at 13 to provide a relatively sharp cutting edge. Side plates 14 also are secured to the back 11 and are shaped as shown in Figure 1. These side plates are preferably provided with lower flanges 15 which are riveted or otherwise secured to the bottom 13, as at 16. A pair of eyebolts 17 are secured to the back 11 and are adapted for connection with suitable chains or cables 17′, the latter being connected to a suitable source of power, such as a tractor to move the device.

A pair of locking devices 18 are arranged rearwardly of the body of the scraper, and each of these devices is preferably formed of a single piece of bar iron or the like. Each locking device includes upper and lower arms 19 and 20 respectively for a purpose to be described, and the upper end of each locking device preferably extends through the back 11, as shown in Figure 4. A nut 22 may be threaded on the inner end of the projecting end 21. The lower end of each locking member is arranged against the rear face of the back 11, as shown at 23, and may be riveted or otherwise secured thereto as indicated at 24′.

A pair of substantially U-shaped guides 24 also are arranged rearwardly of the back 11, outwardly of the locking devices 18, as shown in Figures 1 and 3. The upper arm of each guide member projects through the back 11, as shown at 25, and a nut 26 secures the upper portion of the guide member in position. The lower arm of each guide member has its extremity turned downwardly as at 27 and arranged against the rear face of the back 11 and is riveted or otherwise secured thereto as at 28. A cross bar 29 connects the lower arms of the guide members and is welded or otherwise secured thereto. A substantially U-shaped member 30 also is arranged rearwardly of the body of the device and includes a transverse arm 31 preferably welded to the guide members and also includes arms 32 the upper ends of which are bolted to the back 11 as at 33. The member 30 serves as a brace for the guide members 24, and the transverse bar 31 serves as means for effecting the initial dumping movement of the scraper in a manner to be described.

Figure 2:
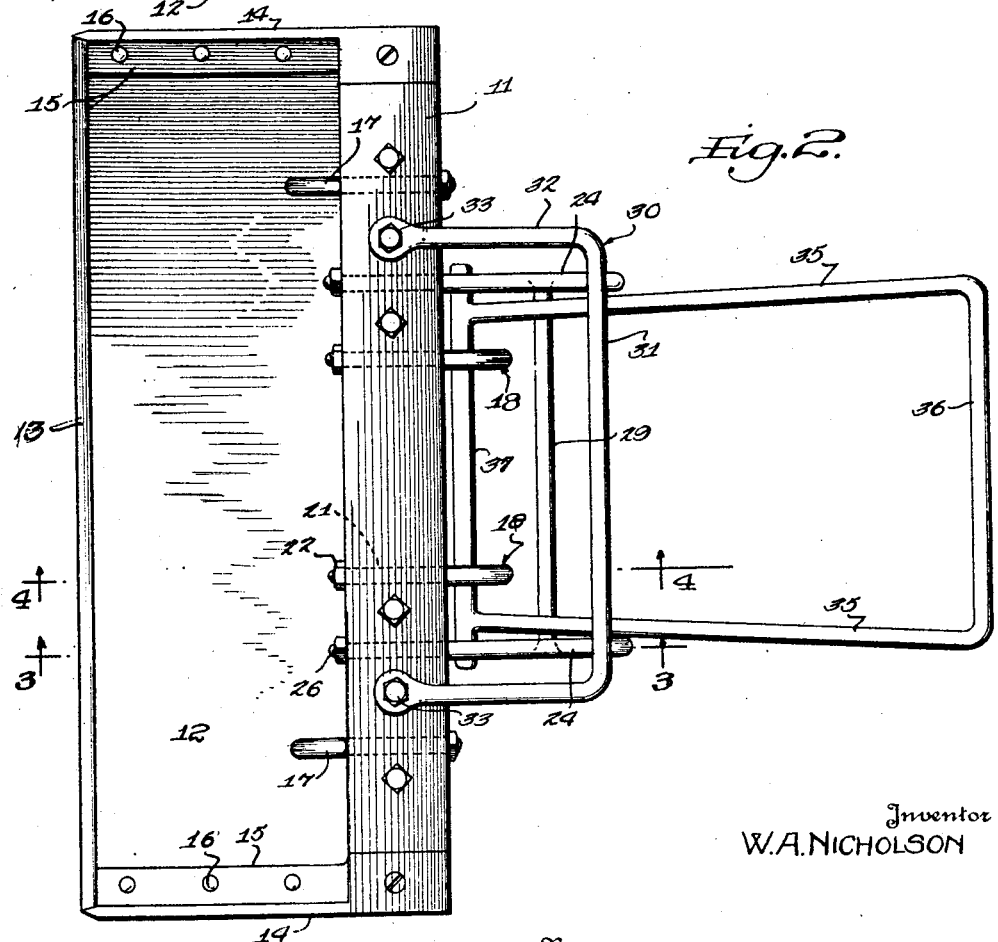
Figure 2 is a plan view.

Referring to Figures 1 and 2, the numeral 34 designates a handle as a whole including a pair of side bars 35 and a rear cross bar 36 which serves as the handle proper. The forward ends of the bars 35 are connected by a transverse bar 37, the ends of which project beyond the bars 35 and engage within the guides 24. The side bars 35 are provided with angular intermediate portions 38, whereby the rear end of the handle is arranged at a sufficient elevation to permit convenient operation of the device.

The operation of the device is as follows:

The scraper is primarily intended for use in scraping roads and the like, but it will be apparent that it is adapted to a variety of uses such as leveling, snow scraping and the like. The device is adapted readily to be controlled by a single operator who walks rearwardly of the device and controls its operation by grasping the cross bar 36. The cable 17' is connected to a suitable source of power such as a tractor or the like to draw the device over the surface to be scraped or leveled. The operator walking rearwardly of the machine readily may control the angle of the device by moving the handle upwardly or downwardly whereby the side bars 35 will contact with either of the cross bars 29 or 31. The movement of the scraper is continued until it is desired to dump the dirt or other material, whereupon the operator lifts the handle to bring the side bars 35 into contact with the cross bar 31. Further upward movement of the handle will then tilt the rear end of the device upwardly causing the forward edge of the bottom 12 to engage the surface upon which the device is being employed. This action obviously stops the forward movement of the device, whereupon further pull on the cable 17' will cause elevation of the rear portion of the scraper. In Figure 5 of the drawings the device is shown in normal position, and in Figure 6 the scraper has been shown slightly tilted substantially to the point at which the forward edge of the bottom 12 engages the surface to stop forward movement of the scraper. The further pull on the cable 17' then tilts the scraper from the position shown in Figure 6, to that shown in Figure 7, and during this movement, which is caused by the movement imparted to the scraper by the source of power, the operator slides the handle rearwardly. A still further pull on the cable 17' will then swing the scraper to the position shown in Figure 8, and the handle having been pulled rearwardly, it will be apparent that the operator may retain his grasp upon the cross bar 36 without causing the side portion 35 to contact with the cross bar 29. If desired, the scraper may be completely dumped by permitting it to swing to the position shown in Figure 9, and the handle is permitted to swing rearwardly to the position shown in Figure 9 without the necessity of the operator releasing the handle. From this position, the scraper is adapted to move forwardly and after it has cleared the pile of material dumped therefrom, the operator may pull rearwardly upon the handle to swing the scraper back to the normal position shown in Figure 5. The operator then moves the handle forwardly to arrange the transverse bar 39 within the locking devices 18, whereupon the handle will be arranged in the proper position to control the angularity of the scraper. It will be apparent that the locking devices secure the transverse bar 37 against vertical movement, whereupon a vertical swinging action transmitted to the cross bar 36 of the handle is adapted to effect a change in the angularity of the device in the manner previously stated. From the foregoing it will be apparent that the device readily may be employed in a variety of uses, and the scraping and dumping operations may be conveniently controlled by a single operator without the necessity of releasing the handle regardless of the position of the device.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a scraper body, means for connecting a source of power to said body to move it forwardly, a handle projecting rearwardly from said body, and a transverse rod carried by said body rearwardly thereof for limiting the downward movement of the rear end of said handle with respect to said body, said handle being movable to release it from said rod.

2. A device of the character described comprising a scraper body, means for connecting a source of power to said body to move it forwardly, a handle projecting rearwardly from said body and having its forward end normally arranged adjacent said body, the rear end of said handle being vertically movable, a transverse rod carried by said body and extending beneath said handle rearwardly of the forward end thereof and adapted to contact with said handle to limit its downward movement, said handle being movable rearwardly to release it from said transverse rod when moved downwardly.

3. A device of the character described comprising a scraper body, means for connecting a source of power to said body to move it forwardly, a handle projecting rearwardly from said body, a transverse member projecting above said handle at a point spaced from its forward end and adapted to contact with said handle, and a second transverse member projecting beneath said handle between said body and said first named transverse member and adapted to limit downward movement of the rear end of said handle, said handle being movable rearwardly to release it from said second transverse member.

4. A device of the character described comprising a scraper body, means for connecting a source of power to said body to move it forwardly, a handle projecting rearwardly from said body and having a transverse member at its forward end normally arranged adjacent said body and adapted to rotate about its axes, a transverse rod extending above said handle at a point spaced from its forward end and adapted to contact with said handle when the latter is swung upwardly, and a second transverse rod extending beneath said handle between said first named rod and the transverse member of said handle, said handle being movable rearwardly to release it from said second rod to permit it to swing downwardly with respect to said body.

5. A device of the character described comprising a scraper body including a bottom having a sharpened forward edge, a handle carried by said body and projecting rearwardly thereof, said handle being adapted to swing vertically and being movable forwardly and rearwardly, a transverse member adapted to contact with said handle when the latter is moved upwardly, and a bar adapted to contact with said handle when the latter is moved downwardly when in its forward position to limit its downward movement, said handle being adapted to be released from said bar when moved rearwardly.

6. A device of the character described comprising a scraper body including a bottom having a sharpened forward edge, a handle projecting rearwardly of said body and including a transverse rod at its forward end arranged adjacent said body, a pair of locking members carried by the rear wall of said body and each including upper and lower members projecting rearwardly therefrom and receiving said transverse rod therebetween, a transverse member carried by said body and extending above said handle at a point spaced from a transverse rod thereof and adapted to contact with said handle when the latter is moved upwardly, a second transverse member carried by said body and extending beneath said handle at a point between said body and said first named transverse member, the transverse rod of said handle being slidable rearwardly in said locking members whereby it is adapted to assume a position rearwardly of said second transverse member.

7. A device of the character described comprising a scraper body including a bottom having a sharpened forward edge, a pair of rearwardly extending guide members carried by said body, a handle projecting rearwardly of said body and including a transverse rod slidable in said guide members, a pair of locking members in which said transverse rod is slidable and rotatable, a transverse member extending above said handle a substantial distance rearwardly of said body and adapted to contact with said handle when the latter is swung upwardly, and a second transverse member extending beneath said handle between said body and said first named transverse member and adapted to limit the downward movement of said handle, said transverse rod being movable rearwardly to assume a position rearwardly of said second transverse member whereby the latter is prevented from limiting the downward movement of said handle.

In testimony whereof I affix my signature.

WILLIAM A. NICHOLSON.